W. S. FARRINGTON & A. H. VAN DENBURG.
PACKING FOR PIPE JOINTS.
APPLICATION FILED MAR. 5, 1906.

907,136.

Patented Dec. 22, 1908.

2 SHEETS—SHEET 1.

WITNESSES:
Chas. J. Toner.
Chas. H. Young.

INVENTORS
William S. Farrington
Almerson H. Van Denburg
BY
Arthur E. Parsons
ATTORNEY

UNITED STATES PATENT OFFICE.

WILLIAM S. FARRINGTON AND ALMERON H. VAN DENBURG, OF SYRACUSE, NEW YORK.

PACKING FOR PIPE-JOINTS.

No. 907,136.  Specification of Letters Patent.  Patented Dec. 22, 1908.

Application filed March 5, 1906. Serial No. 304,391.

*To all whom it may concern:*

Be it known that we, WILLIAM S. FARRINGTON and ALMERON H. VAN DENBURG, of Syracuse, in the county of Onondaga and State of New York, have invented a certain new and useful Packing for Pipe-Joints, of which the following is a specification.

Our invention has for its object the production of a particularly simple and efficient packing for pipe-joints, and to this end, it consists in the combinations and constructions hereinafter set forth and claimed.

In describing this invention, reference is had to the accompanying drawing, in which like characters designate corresponding parts in all the views.

Figure 1:
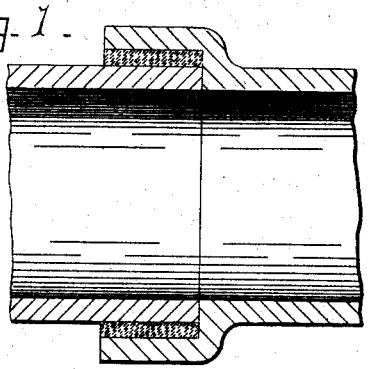
Figure 5:
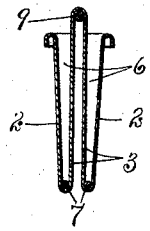
Figure 3:
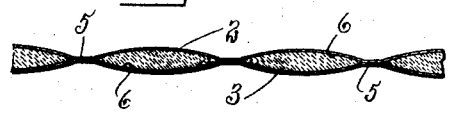
Figure 2:
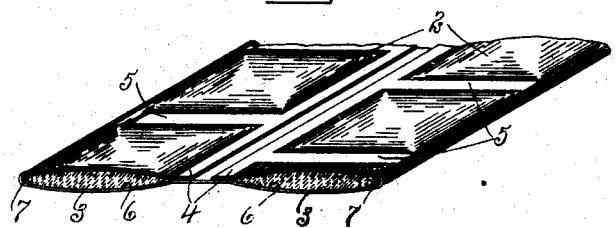
Figure 4:
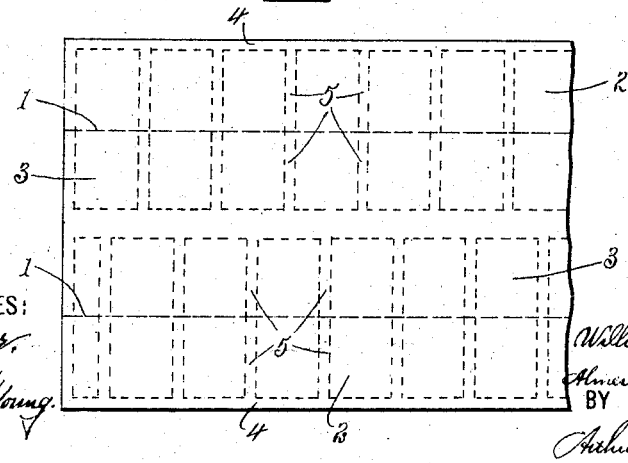
Figure 6:
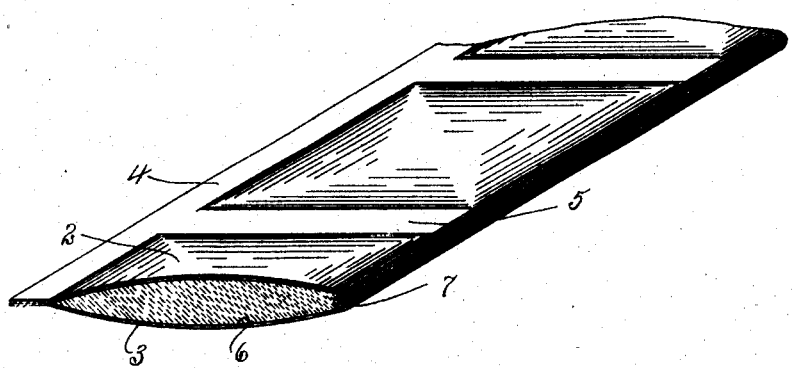
Figure 7:
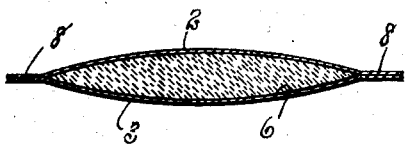

Figure 1 is a longitudinal sectional view through a pipe-joint, provided with our packing. Fig. 2 is an isometric view of a portion of one form of our packing. Fig. 3 is a longitudinal sectional view of a portion of the packing. Fig. 4 is a plan of a portion of the blank from which the inclosing means of the packing is formed. Fig. 5 is a sectional view of said inclosing means when in position to be filled. Figs. 6 and 7 are, respectively, isometric and sectional views of modified forms of our invention.

This packing comprises a flexible elongated element provided with one or more cement-containing pockets.

In the preferable embodiment of our invention, outer longitudinal portions of a flexible strip are folded at 1 upon adjoining longitudinal portions of the strip, thus forming members 2 and 3, the members 2 being united to the portions or members 3, at 1, 4, and 5, in lines extending lengthwise and crosswise of said members, and thereby forming parallel series of pockets 6. As best seen in Figs. 2 and 4, the crosswise connections 5 between the members 2 and 3 at one side of the flexible element alternate with the crosswise connections 5 at the opposite side of said element, so that the pockets 6 of one series alternate with those of the other series. The flexible strip from which the members 2 and 3 are folded, forms the inclosing means of our packing and usually consists of cheese-cloth or other open-mesh fabric having the interstices thereof partly, or entirely, closed by any soluble filling, as glue, paste or sizing. It is apparent, however, that said strip may be composed of any other desirable means. The lengthwise and crosswise connections 4 and 5 are also preferably composed of means, as an adhesive, soluble in water.

Means, as fibrous cords 7, are usually placed in the creases or folds 1 of the flexible element and thus extend longitudinally within the pockets 6 at corresponding edges of said pockets and serve to reinforce the walls thereof at such edges. The cords 7 may, however, be omitted and the flexible element may be reinforced by parts 8 thereof, Fig. 7, extending beyond the pockets 6 at lengthwise edges of such element, or if desired, all reinforcing of the inclosing means of the packing may be dispensed with.

In the manufacture of our packing the members 2 and 3 are folded upon each other and are united at the lines 5, forming pockets open at corresponding ends. The inclosing means of the packing is then mounted on a support 9, as shown in Fig. 5, and any suitable cement is filled within the pockets, after which the open ends of such pockets are closed by uniting the members 2 and 3 at the connections 4. The packing is then ready for use, all that is necessary being to wet the packing to dissolve the connections between the cement-containing pockets and to render the cement plastic.

Our invention is not limited to a flexible element having pockets arranged as described, since as shown in Fig. 6, the flexible element may be provided with but one lengthwise series of pockets. Neither is our invention limited to a packing having the inclosing means thereof constructed of a folded strip, as it is apparent that said inclosing means may consist of opposing strips one above the other, as illustrated in Fig. 7.

Our packing is forced between contiguous surfaces at the joint of a pair of pipes and any water present at this point dissolves the soluble substances of the packing and permits the cement fillings to run together in one mass and to closely adhere to the contiguous surfaces of the pipe-joint. When said packing is used for the joint of submerged pipes, the soluble parts thereof remain undissolved a sufficient length of time to permit the packing to be firmly forced into the joint. By reinforcing the walls of the pockets, as described, we reduce the liability of destruction of the pockets by water entering at the joint of the pipes, or tearing of the pockets when the packing is forced into a joint, and thus minimize the possibility of loss of cement in the practical use of the packing.

What we claim is:—

1. A packing for pipe joints comprising a flexible elongated element provided with a plurality of pockets, portions of the means forming the pockets being soluble in water, and a dry cement filling within the pockets, substantially as and for the purpose specified.

2. A packing for pipe-joints comprising a flexible elongated element provided with a plurality of cement-containing pockets arranged in parallel series lengthwise of said element, the pockets of one series alternating with those of the other series, substantially as and for the purpose described.

3. A packing for pipe-joints comprising a flexible elongated element having outer longitudinal portions thereof folded upon adjoining longitudinal portions and united to said adjoining portions in lines extending lengthwise and crosswise thereof and thereby forming pockets, the crosswise connections between said portions at one side of the flexible element alternating with the crosswise connections of said portions at the opposite side of the flexible element, and a cement filling within the pockets, substantially as and for the purpose set forth.

4. A packing for pipe-joints comprising a flexible elongated element provided with a plurality of cement-containing pockets, soluble material between the pockets, substantially as and for the purpose described.

5. A packing for pipe-joints comprising flexible elongated members united in lines extending lengthwise and crosswise thereof and thereby forming a plurality of pockets, and soluble material at the crosswise and lengthwise connections of said members, and a cement filling within the pockets, substantially as and for the purpose specified.

6. A packing for pipe-joints comprising a flexible elongated element having a longitudinal portion thereof folded upon an adjoining longitudinal portion, said portions being united in lines extending crosswise thereof and a soluble material at the crosswise connections of the flexible element, and a cement filling within the pocket, substantially as and for the purpose set forth.

7. A packing for pipe-joints comprising a flexible elongated element provided with a plurality of cement-containing pockets arranged in parallel series lengthwise of said element, portions of the means forming the pockets being soluble in water, substantially as and for the purpose described.

8. A packing for pipe-joints comprising a flexible elongated element having outer longitudinal portions thereof folded upon adjoining longitudinal portions and united to said adjoining portions in lines extending lengthwise and crosswise thereof and thereby forming pockets, the connections between said longitudinal portions being soluble in water, reinforcing means arranged in the folds of said longitudinal portions, and a cement filling within the pockets, substantially as and for the purpose described.

In testimony whereof, we have hereunto signed our names in the presence of two attesting witnesses, at Syracuse, in the county of Onondaga, in the State of New York, this 26th day of February, 1906.

WILLIAM S. FARRINGTON.
ALMERON H. VAN DENBURG.

Witnesses:
   S. DAVIS,
   B. ARONSON.